UNITED STATES PATENT OFFICE.

GEORGE A. CASSELMAN, OF FORT DODGE, IOWA.

COMPOSITION OF MATTER FOR WALL DECORATION.

SPECIFICATION forming part of Letters Patent No. 482,544, dated September 13, 1892.

Application filed November 23, 1891. Serial No. 412,878. (No specimens.)

*To all whom it may concern:*

Be it known that I, GEORGE A. CASSELMAN, a citizen of the United States of America, residing at Fort Dodge, in the county of Webster and State of Iowa, have invented a new and useful Composition for Ornamenting Walls in Buildings, &c., of which the following is a specification.

My object is to provide an article of manufacture and commerce that can be preserved and shipped in a dry state and readily prepared by means of water to be used as a plastic compound for producing ornamental relief-work or reduced to be used as a paint and applied by means of a brush to cover a wall or other surface.

My composition consists of the following ingredients, combined in about the proportions and in the manner stated, viz: To ninety (90) pounds of stucco, calcined plaster, or plaster-of-paris I add ten (10) pounds of whiting, ten (10) pounds of glue, two (2) pounds of borax, and two (2) pounds of corn-starch and grind and mix them into a powdered state adapted to be placed into suitable receptacles for storing or transporting and also adapted for use as hereinafter stated. Any desired quantity may be thus prepared and used whenever desired for the purposes stated.

To prepare the composition for use to produce ornaments in relief on a ceiling or wall of a building or elsewhere, I simply add hot water in sufficient quantity to produce a plastic of proper consistency to adapt it to be handled and shaped in molds.

To prepare the composition to be used as a paint, I add water sufficient to produce a liquid adapted to be applied to the surface of a ceiling, wall, or other object by means of a brush.

Coloring-matter may be advantageously added and stirred into the liquid to produce any shade of surface desired.

What I claim, and desire to secure by Letters Patent of the United States, is—

The herein-described composition of matter to be used for ornamenting walls, &c., consisting of stucco, calcined plaster, whiting, glue, borax, and corn-starch in about the proportions specified.

GEORGE A. CASSELMAN.

Witnesses:
NETTIE ROSE,
MARY MOORE.